United States Patent [19]

Temple

[11] Patent Number: 4,884,728

[45] Date of Patent: Dec. 5, 1989

[54] BICYCLE CARRIER

[76] Inventor: William A. Temple, 2974 Ingalls Way, Eugene, Oreg. 97405

[21] Appl. No.: 337,831

[22] Filed: Apr. 14, 1989

[51] Int. Cl.$^4$ ............................................. B60R 9/10
[52] U.S. Cl. ........................... 224/42.13; 224/42.03 B
[58] Field of Search ............... 224/42.13, 42.14, 42.16, 224/42.18, 42.19, 42.12, 42.03 B, 42.06, 315, 319, 330, 42.24, 42.26, 309; 211/17, 22, 18, 5, 8, 7

[56] References Cited

U.S. PATENT DOCUMENTS 4,189,074  2/1980  Davies ............................. 224/42.13
4,392,597  7/1983  Traugh ........................ 224/42.03 B Primary Examiner—Linda J. Sholl
Attorney, Agent, or Firm—John F. Ingman

[57] ABSTRACT

A bicycle carrier includes a spare tire supported framework having two horizontal bar members in parallel spaced relationship, one located outside of the vertically mounted spare tire and the other to the inside, between the spare tire and the vehicle body. Two tire support members, or straps, which preferably are rigid but may be flexible, lie against the upper tread of the tire at spaced circumferential locations, each strap attached between the two horizontal bar members so as to form a framework. A vehicle mounting member, preferably in square tubular form, is attached to, and extends downward from, the inside horizontal bar member. Extending outwardly from the outside horizontal bar are a plurality of bicycle support arms, so as to project beneath the frame of, and support the bicycle substantially centered behind the vehicle. The outside horizontal bar member may extend assymmetrically beyond the side of the tire with one or more bicycle support arms positioned on the extending portion. A framework positioning and vehicle attachment means includes a length of upwardly extending, preferably square, tubing, formed to concentrically fit about the downwardly extending vehicle mounting member so as to position the tire support framework correctly atop the tire. This tubing is attached to the spare tire mounting frame or bracket of the vehicle. The spare tire supported framework may be removably locked to the framework positioning and attachment means.

6 Claims, 2 Drawing Sheets

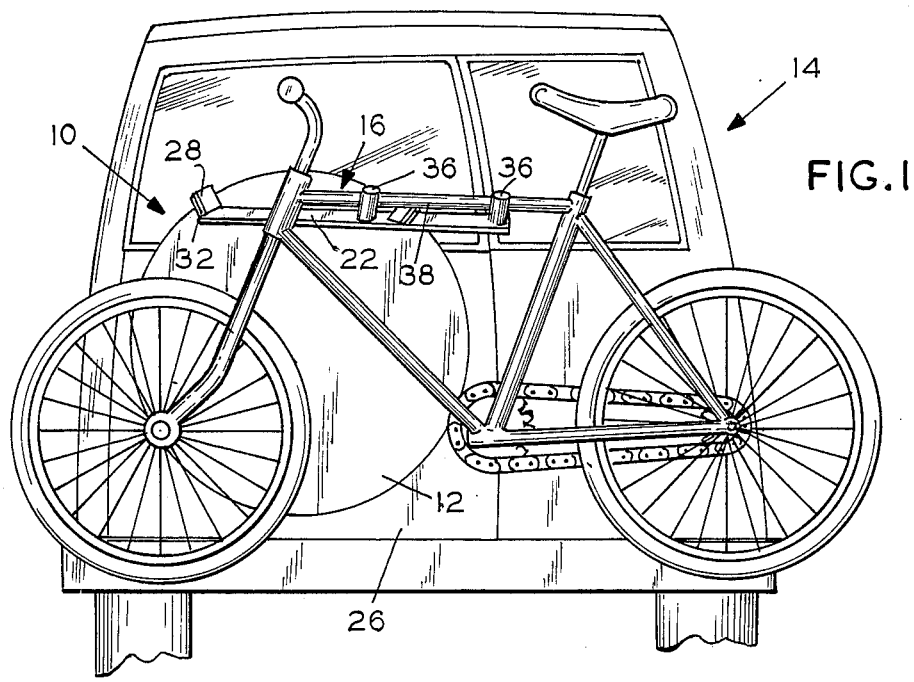
FIG. 1
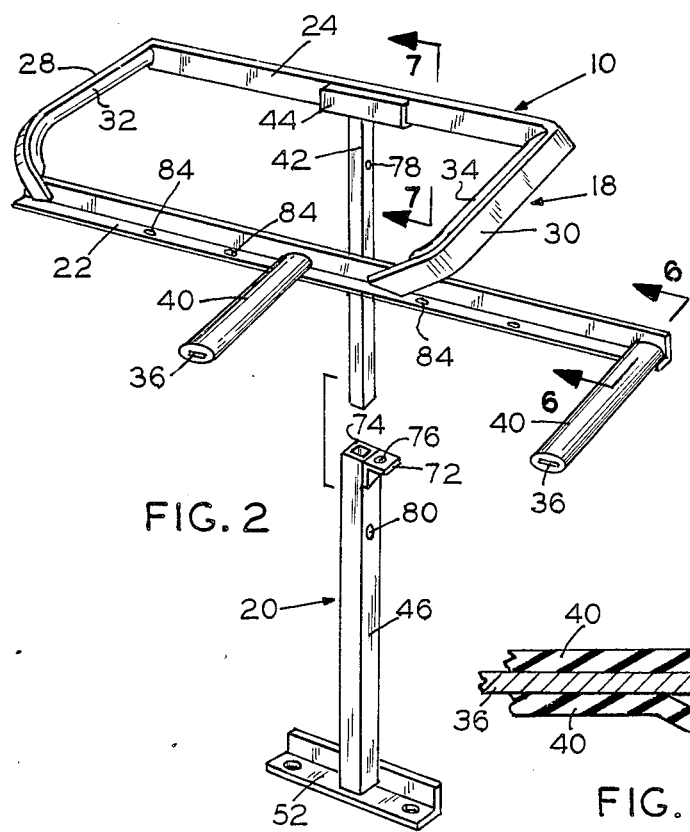
FIG. 2
FIG. 6
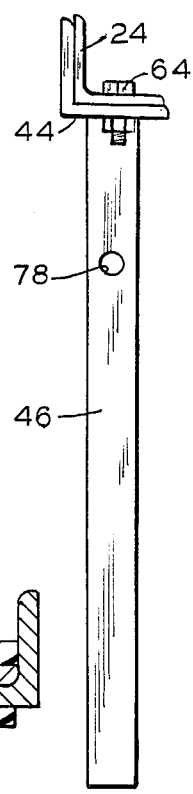
FIG. 7

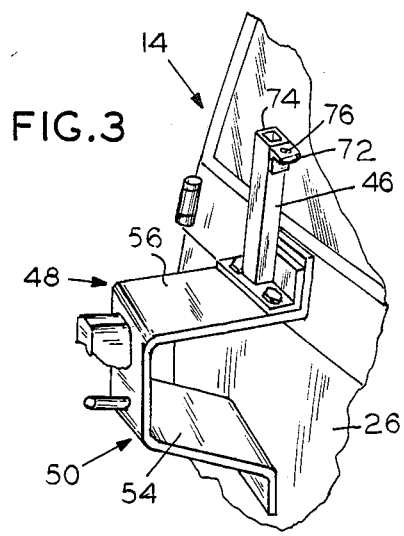
FIG. 3
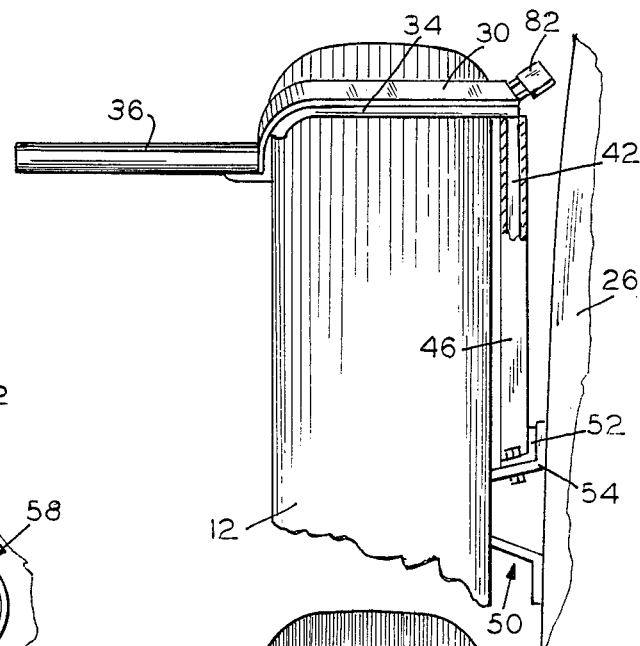
FIG. 4
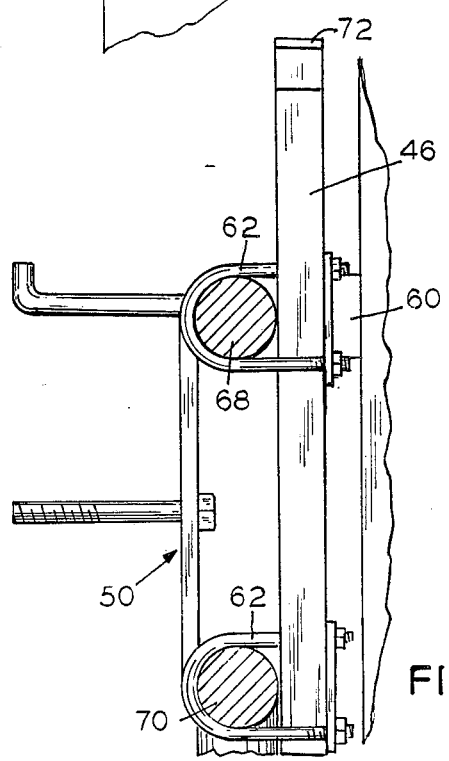
FIG. 8
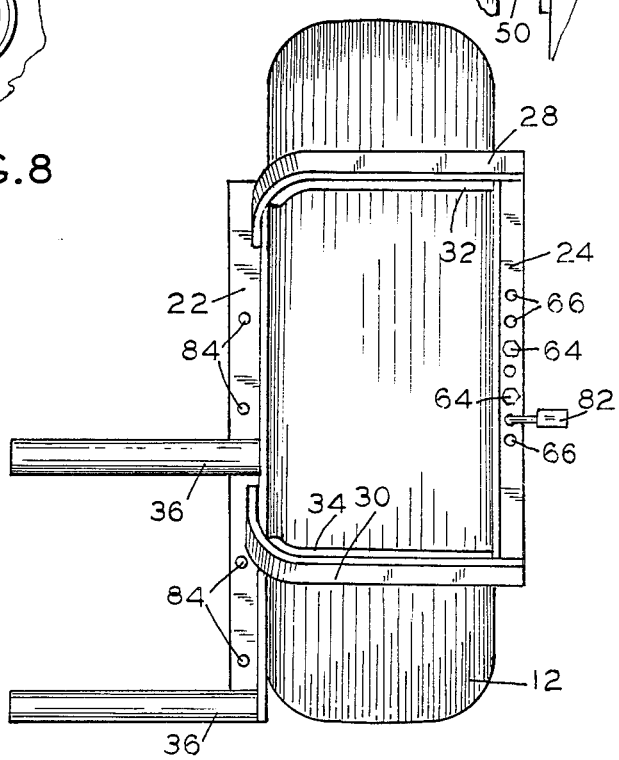
FIG. 5
FIG. 9

BICYCLE CARRIER

BACKGROUND OF THE INVENTION

1. Field of the Invention

This invention involves a bicycle carrier, and, more particularly, a bicycle carrier which utilizes for support the externally mounted spare tire, as found on sports utility vehicles, recreational vehicles, vans, and the like.

2. Description of the Prior Art

Various bicycle carriers have been developed for the transport of bicycles on vehicles. Commonly, such carriers mount the bicycle on top of the vehicle, with accompanying difficulties in loading and unloading the bicycle, or by an apparatus which attaches to the rear of the vehicle, as at the bumper. Such carriers may be complex in their attachment, have structural limitations, and take significant effort to install and remove. Further, such rear-mounting bicycle carriers may not fit where there is an externally mounted rear tire, such as with various sports utility vehicles, recreational vehicles, vans and the like, and if mounted, will not permit access through the back of the vehicle, past the mounted bicycle.

What is needed is a bicycle carrier, for use with motor vehicles having a external vertically mounted spare tire, which is:

a. rugged in construction;
b. easy to load and unload;
c. simple to install and remove;
d. utilizes the spare tire for support of the carrier and bicycle; and
e. when possible, according to the vehicle design, swings away with the mounted spare tire to allow access through the rear of the vehicle.

SUMMARY OF THE INVENTION

The present invention provides a bicycle carrier which is designed to satisfy the aforementioned needs. The invention involves a spare tire supported framework, including means for supporting the bicycle therefrom, and means of positioning and attaching that framework to the vehicle.

Accordingly, the bicycle carrier, in its preferred embodiment includes a spare tire supported framework which includes two horizontal bar members in parallel spaced relationship, one located outside of the vertically mounted spare tire and the other to the inside, between the spare tire and the vehicle body. Two spaced tire support members, or straps, which preferably are rigid but may be flexible, lie against the upper portion of the tire at spaced circumferential locations centered about the top of the tire, each strap attached between the two horizontal bar members, so as to form a framework wherein the tire support members are supported by the spare tire at their positions of contact with the tire, and are held in this support position by the two horizontal bar members. A vehicle mounting member is attached perpendicular to the inside bar member and extends vertically downward from its attachment. This mounting member preferably is of a square tubular form.

Extending transversely and outwardly from outside horizontal bar are a plurality of bicycle support arms, normally two or three, so as to project beneath and support the frame of the bicycle. The arms may be padded to protect the bicycle from scratches. The bicycle support arms are located so as to provide a bicycle carrying location which is substantially centered behind the vehicle. In some cases, this requires the outside horizontal bar member to extend assymmetrically beyond the side of the tire with one or more bicycle support arms positioned on the extending portion for a proper location of the bicycle.

A framework positioning and vehicle attachment means includes a length of upwardly extending preferably square, tubing, formed to concentrically fit about the downwardly extending vehicle mounting member so as to position and maintain the tire support framework correctly atop the tire. This tubing is attached to the spare tire mounting means, such as, in the case of sideways extending V-shaped frame, by clamping the tubing to that frame. When the spare tire is mounted to a protruding support bracket attached directly to the body of the vehicle, the positioning tube may be directly mounted to this bracket, as through a transverse member connected to the tube. The spare tire supported framework may be removably locked to the framework positioning and attachment means.

BRIEF DESCRIPTION OF THE DRAWINGS

FIG. 1 illustrates the bicycle carrier installed atop the externally-carried spare tire of a vehicle, and supporting a bicycle.

FIG. 2 illustrates the bicycle carrier, separate from the vehicle.

FIG. 3 illustrates a positioning and vehicle attachment member, which, as shown, is mounted on a conventional protruding spare tire support bracket attached directly to the body of the vehicle.

FIG. 4 illustrates a side view of the bicycle carrier installed and supported atop the spare tire.

FIG. 5 illustrates a top view of the bicycle carrier of FIG. 4.

FIG. 6 illustrates a cross section, as seen at line 6—6 of FIG. 2, of the bicycle support arms, protected by foam padding.

FIG. 7 illustrates a cross section, as seen at line 7—7 of FIG. 2, showing the vehicle mounting member attached to the inside bar member.

FIG. 8 illustrates a hinged, V-shaped frame configuration for swing mounting of spare tires, to which the vehicle positioning and attachment member of the bicycle carrier is clamped, with an alternative position also being shown.

FIG. 9 illustrates a cross section showing enlarged details of the clamping of the vehicle positioning and attachment member to the V-shaped spare tire mounting frame.

DESCRIPTION OF THE PREFERRED EMBODIMENT

Referring now to the drawings, there is shown in FIG. 1 a preferred embodiment of the bicycle carrier 10 installed atop the externally-mounted spare tire 12 of a vehicle 14, and supporting a bicycle 16.

The bicycle carrier 10 is comprised of two separate members, a spare tire supported frame work 18, which is supported by the vertically mounted spare tire 12, and which, in turn, provides support for, and carries, the bicycle 16; and a positioning and vehicle attachment member 20 which connects the spare tire supported framework 18 to the vehicle 14, thereby correctly positioning the framework 18 on top of the spare tire 12 and maintaining it in that position.

The spare tire supported framework 18, in its preferred embodiment, includes two horizontal bars 22 and 24 in parallel spaced relationship, an outside horizontal bar 22 located to the outside of the vertically-mounted spare tire 12, and an inside horizontal bar 24 located between the spare tire 12 and the body 26 of the vehicle 14. Two tire support members or straps 28 and 30, which preferably are rigid in structure but which may be flexible, are attached between the spaced outside and inside horizontal bars 22 and 24, so as to form a framework wherein the straps 28 and 30 are supported by the spare tire 12, and are held in position by the two horizontal bar members 22 and 24 from their locations on the outside and inside of the spare tire 12. If desired, padding, as at 32 and 34, may be placed at the contact between the straps 28, 30 and the spare tire 12.

Extending transversely and outwardly from the outside horizontal bar 22 are a plurality, normally two or three, of bicycle support arms 36 which project beneath the frame 38 of the bicycle 16. These arms 36 may be canted slightly upwards to provide more secure support, and may be padded, as with foam tubing 40, to protect the bicycle 12 from scratches. The extending bicycle support arms 36 are positioned on the outside horizontal bar 22 so as to provide a bicycle support position which substantially centers the bicycle 16 behind the vehicle 14. As illustrated, this may require that the outside horizontal bar 22 extends assymetrically beyond one side of the spare tire 12 with one or more bicycle support arms 36 located on the extending portion for proper support of the bicycle frame 38. The bicycle 16 may be tied to the bicycle carrier 10 by conventional means, such as with rope, cable, or the like (not shown) passing through holes 84 formed in the outside horizontal bar 22, or may otherwise be secured to the vehicle 14 or its spare tire 12, in the manner desired.

Completing the spare tire supported framework 18 is a vehicle mounting tube 42 which is attached to the inside horizontal bar 24, and which extends vertically downward therefrom. A transverse attachment member 44 may be used to facilitate attachment of the inside horizontal bar 24 to the vehicle mounting tube. The vehicle mounting tube 42 preferably is square in cross section, so as to concentrically engage the positioning tube 46 of the framework positioning and vehicle attachment member 20.

The framework positioning and vehicle attachment member 20 as noted above, connects the spare tire supported framework 18 to the vehicle 14 so that it is in the proper position to be fully supported by the spare tire 12. This attachment member 20 is not utilized to support the weight of the bicycle carrier 10, or bicycle 16, but rather to attach and properly position the spare tire supported framework 18 aboard the vehicle 14. The configuration of the attachment member 20 may vary, depending on the design of the vehicle 14 and the manner of mounting the spare tire 12 thereon. Common to the attachment member 20, however, is a positioning tube 46, preferably square in cross section, which is formed to fit concentrically about the downwardly extending vehicle mounting tube 42. This positioning tube 46 is attached to the spare tire mount 48 of the vehicle. In vehicles 14, where the spare tire mount 48 is in the form of a protruding support bracket 50 attached directly to the body 26 of the vehicle 14, the positioning tube 46 may be directly mounted thereon, as by bolting or welding a transverse member 52, such as an angle iron, attached to the positioning tube 46, onto the base 54 of the support bracket 50. Where the top face 56 of the support bracket base 54 is not horizontal, the transverse member 52 may have to be canted slightly to provide the positioning tube 46 with the desired vertical orientation. Such vehicle mounting is best seen at FIG. 3 and FIG. 4.

For those vehicles 14, where the spare tire mount 48 is a sideways extending V-shaped frame 58, generally hinged as at 60 so to be able to swing the spare tire 12 aside for entry into the back of the vehicle 14, the positioning tube 46 may be mounted by clamping 62 to the V-shaped frame 58. Such attachment of the positioning tube 46 to the V-shaped frame 58 is preferably centered behind the spare tire 12 to coincide with a central attachment of the vehicle mounting tube 42 to the inside horizontal bar 24. However, with some vehicles, it may be ncessary to offset the attachment of the positioning tube 46 to avoid portions of the spare tire mount 48, with a corresponding offset in the attachment of the vehicle mounting tube 42 to the inside horizontal bar 24, so as to retain the proper position of the spare tire supported framework 18 with respect to the spare tire 12. Adjustment of the position of attachment between the vehicle mounting tube 42 and the inside horizontal bar 24 may be made, where the attachment is by bolts 64, by the use of appropriately spaced, e.g., one-inch apart, supplementary holes 66 on the inside horizontal bar 24. Such alternative, off-center location of the positioning tube 46 is shown in dashed lines in FIG. 8. FIG. 8 and FIG. 9 illustrate one manner of mounting the positioning tube 46 to the V-shaped frame 58, wherein the positioning tube 46 is diagonally clamped, with conventional U-clamps 62 across both the upper horizontal member 68 and the lower converging member 70 of the V-shaped frame 58.

The positioning and vehicle attachment member 20 thus being attached to the vehicle 14, and the spare tire supported framework 18 being removably engaged thereon, through the concentric joining of the vehicle mounting tube 42 within the positioning tube 46, it is desirable to provide a means of locking the vehicle mounting tube 42 to the positioning tube 46 to prevent unintentional or undesired separation of the spare tire supported framework 18 from the vehicle 14. Various means of such locking are available, a simple method being the forming of a tab 72, extending horizontally from the top 74 of the positioning tube 46, having a hole 76 formed therein, which is aligned with a supplementary hole 66 formed in the inside horizontal bar 2. Alternatively, where space between the spare tire 12 and the body 26 of the vehicle 14 permits, a set of horizontal holes 78 through the vehicle mounting tube 42, and a corresponding set of holes 80 through the positioning tube 46 may be formed. When the spare tire supported framework 18 is mounted, a simple padlock 82 can be inserted through the appropriate set of holes, 66 and 76, or 78 and 80, which will removably secure the bicycle carrier 10 into a single unit.

It is thought that the spare tire mounted bicycle carrier of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:

1. A bicycle carrier, for use with an external, vertically mounted spare tire as found attached to a spare tire carrier mount on sports utility vehicles, recreational vehicles, vans, and the like, comprising:

a. a spare tire supported framework, which includes:

a first horizontal bar member and a second horizontal bar member, in parallel, spaced relationship, the first horizontal bar member lying to the outside of the spare tire and the second horizontal bar member lying to the inside of the spare tire, between the spare tire and the body of the vehicle;

a plurality of tire support members formed to lay against the tread of the spare tire at spaced locations along the circumference of the upper portion of said spare tire, each said tire support member being attached between the first horizontal bar member and the second horizontal bar member, so as to form a framework which is supported by the spare tire;

bicycle support means, which include a plurality of bicycle support arms which extend outwardly from the first horizontal bar member so as to project beneath portions of, and support, the bicycle; and a vehicle mounting member perpendicularly attached to the second horizontal bar member, and extending downwards from the attachment; and b. a framework positioning and vehicle attachment means, which include:

a positioning member extending upwardly and formed to engage with the downwardly extending vehicle mounting member so as to position the spare tire supported framework relative to the spare tire; and vehicle attachment means which attach the upwardly extending positioning member to a vehicle spare tire carrier mount.

2. The bicycle carrier, as recited in claim 1, wherein the first horizontal bar member extends assymetrically beyond a side of the spare tire, with at least one bicycle support arm located on the extending portion.

3. The bicycle carrier, as recited in claim 1, wherein said vehicle support member and said positioning member are tubular in form, so as to concentrically engage one with the other.

4. The bicycle carrier, as recited in claim 3, wherein said tubular form of said vehicle support member and said positioning member is of square cross section.

5. The bicycle carrier, as recited in claim 1, wherein there are means to removably secure and lock the spare tire supported framework to the framework positioning and vehicle attachment means.

6. The bicycle carrier, as recited in claim 5, wherein the means to removably secure and lock the spare tire supported framework to the framework positioning and vehicle attachment means includes a hole formed through the spare tire supported framework and a hole formed through the framework positioning and vehicle attachment means, said holes formed to align when the spare tire supported framework and the framework positioning and vehicle attachment means are properly engaged; and a locking device inserted through the aligned holes, thereby securing the bicycle carrier upon the vehicle in bicycle carrying position.

* * * * *